(12) United States Patent
Busch et al.

(10) Patent No.: US 7,128,969 B2
(45) Date of Patent: Oct. 31, 2006

(54) METHOD FOR THE PRODUCTION OF BIOLOGICALLY-DEGRADABLE PACKAGINGS MADE FROM BIAXIALLY-DRAWN FILMS

(75) Inventors: Detlef Busch, Saarlouis (DE); Marlies Rosenbaum, Bous (DE); Manfred Rosenbaum, Bous (DE)

(73) Assignee: Trespaphan GmbH (DE)

( * ) Notice: Subject to any disclaimer, the term of this patent is extended or adjusted under 35 U.S.C. 154(b) by 0 days.

(21) Appl. No.: 10/472,913

(22) PCT Filed: Apr. 23, 2002

(86) PCT No.: PCT/EP02/04443

§ 371 (c)(1),
(2), (4) Date: Sep. 22, 2003

(87) PCT Pub. No.: WO02/087851

PCT Pub. Date: Nov. 7, 2002

(65) Prior Publication Data

US 2004/0093831 A1 May 20, 2004

(51) Int. Cl.
| | | |
|---|---|---|
| B32B 27/10 | (2006.01) | |
| B32B 27/18 | (2006.01) | |
| B32B 27/32 | (2006.01) | |
| B32B 27/36 | (2006.01) | |
| B32B 38/10 | (2006.01) | |

(52) U.S. Cl. ............... 428/337; 428/339; 428/346; 428/347; 428/349; 428/480; 428/481; 428/507; 428/511; 428/512; 428/910; 264/288.4; 264/290.2; 264/291; 264/292; 264/319; 264/320; 264/322; 264/544; 264/550; 264/553; 264/554; 156/196; 156/210; 156/212; 156/245; 156/297; 156/308.2; 156/308.4; 156/309.9

(58) Field of Classification Search ............... 428/480, 428/481; 264/510, 239, 299, 259; 156/308.2, 156/322
See application file for complete search history.

(56) References Cited

U.S. PATENT DOCUMENTS

| | | | | |
|---|---|---|---|---|
| 4,192,443 A | * | 3/1980 | McLaren | 229/120.14 |
| 4,202,465 A | * | 5/1980 | McLaren | 229/120.17 |
| 4,337,116 A | * | 6/1982 | Foster et al. | 162/158 |
| 4,466,553 A | * | 8/1984 | Zenger | 220/495.08 |
| 4,862,671 A | * | 9/1989 | Lanoiselee et al. | 53/167 |
| 5,028,000 A | * | 7/1991 | Chabot et al. | 229/143 |
| 5,180,765 A | * | 1/1993 | Sinclair | 524/306 |
| 5,502,158 A | * | 3/1996 | Sinclair et al. | 528/354 |
| 5,565,163 A | * | 10/1996 | Forbes et al. | 264/290.2 |
| 5,627,150 A | * | 5/1997 | Peterson et al. | 510/439 |
| 5,714,573 A | * | 2/1998 | Randall et al. | 528/354 |
| 5,760,118 A | * | 6/1998 | Sinclair et al. | 524/306 |
| 5,849,374 A | * | 12/1998 | Gruber et al. | 428/34.3 |
| 6,114,495 A | * | 9/2000 | Kolstad et al. | 528/354 |
| 6,153,276 A | * | 11/2000 | Oya et al. | 428/35.2 |
| 6,153,308 A | * | 11/2000 | Oya et al. | 428/515 |
| 6,248,430 B1 | * | 6/2001 | Toyoda et al. | 428/213 |
| 6,323,307 B1 | * | 11/2001 | Bigg et al. | 528/354 |
| 6,353,086 B1 | * | 3/2002 | Kolstad et al. | 528/354 |
| 6,495,631 B1 | * | 12/2002 | Randall et al. | 525/186 |
| 6,572,806 B1 | * | 6/2003 | Oya et al. | 264/174.1 |
| 6,756,331 B1 | * | 6/2004 | Kitahara et al. | 442/327 |
| 6,869,991 B1 | * | 3/2005 | Murschall et al. | 524/91 |
| 6,872,460 B1 | * | 3/2005 | Murschall et al. | 428/480 |
| 6,902,818 B1 | * | 6/2005 | Murschall et al. | 428/480 |
| 2003/0108755 A1 | * | 6/2003 | Murschall et al. | 428/480 |
| 2003/0170479 A1 | * | 9/2003 | Peiffer et al. | 428/515 |
| 2004/0209073 A1 | * | 10/2004 | Rosenbaum et al. | 428/337 |
| 2005/0098928 A1 | * | 5/2005 | Rosenbaum et al. | 264/492 |

FOREIGN PATENT DOCUMENTS

| | | | |
|---|---|---|---|
| DE | 198 30 389 | | 1/2000 |
| JP | 09-025345 | * | 1/1997 |
| JP | 09 174674 | | 7/1997 |
| WO | WO-92/04412 | | 3/1992 |

OTHER PUBLICATIONS

Schimtz, Peter et al., "Films." Ullmann's Encyclopedia of Industrial Chemistry, 5th Ed., vol. A11 (1988), pp. 85-95, 108-110.*
Shimada Takashi, "Polylactic Resin Composition for Transparent Molding," Patent Abs. of Japan:No. 10. Abstract of JP 10 120890 (Daicel Chem IND LTD), (May 12, 1998).

* cited by examiner

*Primary Examiner*—Vivian Chen
(74) *Attorney, Agent, or Firm*—Connolly Bove Lodge & Hutz LLP

(57) ABSTRACT

The invention relates to a method for the plastic shaping of a biaxially-drawn film, comprising at least one base layer, containing at least one polymer (I), made from at least one hydroxycarboxylic acid and $\geq 0.2$ wt %, based on the weight of the layer, of a thermoplastic polymer (II), different from polymer (I). Said film is plastically moulded by application of pneumatic and/or mechanical forces.

27 Claims, No Drawings

METHOD FOR THE PRODUCTION OF BIOLOGICALLY-DEGRADABLE PACKAGINGS MADE FROM BIAXIALLY-DRAWN FILMS

The present invention relates to a process for the production of thermoformed packaging starting from a biaxially stretched film. This thermoformed packaging is biodegradable if desired. The use of plastic packaging has increased considerably in recent decades. Plastic packaging offers protection against moisture and dirt, safeguards hygiene, provides an attractive appearance and protects the packaged goods against misuse with use of a comparatively small amount of material Disposal of these materials has now become a problem which is growing in the same way. Recycling systems are being developed only very slowly, have questionable effectiveness and are often only implemented regionally, for example in Germany. In addition, petroleum as the natural starting material for polyolefinic thermoplastics is limited. These circumstances result in the basic requirement for suitable packaging materials made from renewable raw materials which can in addition be disposed of in an environmentally friendly manner.

This need has resulted in the development of polymers whose preparation chain begins with renewable raw materials. Examples thereof are polymers and copolymers of lactic acids and other hydroxycarboxylic acids, referred to below as PLAs. These are hydrolysed slowly at a certain atmospheric humidity level and elevated temperature and ultimately decompose to form water and $CO_2$. These polymers are therefore known as degradable polymers and can be prepared from vegetable renewable raw materials. PLA is prepared on an industrial scale by ring-opening polymerisation of a cyclic lactic acid dimer which is known as lactide. Corresponding processes are known from the prior art and are described, for example, in U.S. Pat. No. 1,995,970 or U.S. Pat. No. 2,362,511.

Besides the raw materials per se, the prior art also discloses film products made from PLA. For example, U.S. Pat. No. 5,443,780 describes the production of oriented films made from PLA. The process starts from a PLA melt, which is extruded and rapidly cooled. This pre-film can subsequently be subjected to a uniaxial stretching process or subjected to sequential or simultaneous biaxial stretching. The stretching temperature is between the glass transition temperature and the crystallisation temperature of the PLA. The stretching results in increased strength and a higher Young's modulus in the final film. If desired, the stretching is followed by heat-setting.

The prior art furthermore discloses that non-oriented materials made from thermoplastic polymers can be converted into mouldings by thermoforming. The use of non-oriented PLA films for thermoforming is also known. For example, Schlicht in Kunststoffe 88, (1998) 6, pp. 888–890, describes the thermoforming of thick PLA cast film for the production of yoghurt pots. In order to achieve the requisite inherent strength of the pot, the starting material here is a thick film. The mouldings produced in this way usually have wall thicknesses of several 100 µm. In this way, a fully compostable yoghurt pot is obtained which can be disposed of in an environmentally friendly manner and with no residues.

DE 69224772T2 describes the production of laminates of PLA and leather, paper, cellulose, fabric, etc. The adhesives proposed are preferably degradable adhesives, such as, for example, glue, gelatine, casein and starch. Application of an organotitanium compound, organosilane compound or polyethyleneimine as adhesive layer is likewise described as advantageous.

EP-A-0514137 describes the production of a laminate from a layer based on polylactic acid and a layer of regenerated cellulose, paper, leather, cloth or fibres. In both cases, the sheet-like composites are subsequently converted further into mouldings.

DE 69317474T2 describes the preparation of a composite material having improved gas barrier properties. These gas barrier properties are achieved by coating a PLA film with aluminium.

A further development in the area of environmentally friendly packaging materials is concerned with the replacement of polystyrene containers and trays with corresponding mouldings based on starch or other degradable polymers. An essential disadvantage of these mouldings based on starch is the poor stability to aqueous or moist contents. The starch takes up the moisture, becomes soggy and loses all mechanical stability. Mouldings made from starch cannot be used for such applications. Although it is in principle possible to make these starch mouldings sufficiently water-repellent by means of corresponding coatings, these coatings are, however, themselves usually not made from a renewable raw material and are not biodegradable, meaning that the environmental compatibility of the composite as a whole is no longer guaranteed.

DE 101 11 686.1 describes that biaxially oriented films made from polylactic acid (PLA) can be thermoformed. Owing to this property, PLA film can be employed for the production of a very wide variety of thermoformed packaging. The thermoformability of this PLA film is still unsatisfactory.

The object of the present invention was to provide a film which can advantageously be employed in shaping processes, such as, for example, thermoforming. In particular, the film should be capable of very good thermoforming within a broad temperature range. It is additionally desirable to employ the smallest possible amount of material for the thermoformed packaging. The aim is thus to provide a process for the production of environmentally friendly packaging in which, in addition, renewable raw materials are employed. It should advantageously be possible to dispose of the packaging in an environmentally friendly manner, preferably for it to be composted under suitable conditions.

This object is achieved by a process for the plastic shaping of a biaxially stretched film which is composed of at least one base layer which comprises at least one polymer I made from at least one hydroxycarboxylic acid and $\geq 0.2\%$ by weight, based on the weight of the layer, of a thermoplastic polymer II which is different from the polymer I, and where this film is plastically shaped through the action of pneumatic and/or mechanical forces.

This object is furthermore achieved through the use of a biaxially stretched film for the production of packaging, where the film is composed of at least one base layer which comprises at least one polymer I made from at least one hydroxycarboxylic acid and $\geq 0.2\%$ by weight, based on the weight of the layer, of a thermoplastic polymer II which is different from the polymer I.

The object is furthermore achieved by a process for the production of packaging which is composed, as constituent, of a biaxially stretched, plastically shaped film, where the film is composed of at least one base layer which comprises at least one polymer I made from at least one hydroxycarboxylic acid and ≧0.2% by weight, based on the weight of the layer, of a thermoplastic polymer II which is different from the polymer I.

The object is furthermore achieved as indicated in the independent claims. The processes, uses and subject-matters of the dependent sub-claims are preferred embodiments of the invention.

In accordance with the invention, the biaxially oriented film is composed of at least one base layer which comprises at least one polymer I made from at least one hydroxycarboxylic acid and ≧0.2% by weight, based on the weight of the layer, of a thermoplastic polymer II which is different from the polymer I. The base layer preferably comprises from 0.5 to 15% by weight of the polymer II, in particular from 1.0 to 10% by weight, in each case based on the base layer. With respect to compostability of the packaging, it is advantageous to keep the content of polymer II as low as possible. For compostable embodiments of this type, the amount of polymer II should be from 0.2 to 5% by weight, preferably from 0.2 to 3% by weight, based on the base layer.

It has been found that the addition of the thermoplastic polymers II described in greater detail below to the base layer considerably improves the thermoformability of the biaxially stretched film made from polyhydroxycarboxylic acid. It has been found that films comprising mixtures of this type in the base layer can be shaped, in particular thermoformed, in a very broad temperature range. Surprisingly, both shaping processes at elevated temperatures and shaping processes at a temperature of from 15 to <40° C., preferably from 20 to 30° C., are possible. It has additionally been found that the biaxially stretched films according to the invention can be employed in the shaping processes even with a very small thickness if a thermoplastic polymer II is added to the base layer made from polyhydroxycarboxylic acid.

For the purposes of the present invention, the term base layer of the film is taken to mean the layer which comprises at least one polymer I made from at least one hydroxycarboxylic acid and ≧0.2% by weight, based on the weight of the layer, of a thermoplastic polymer II which is different from the polymer I and which has the greatest layer thickness and makes up at least 40% of the total film thickness. In the case of single-layered embodiments, the film consists only of this base layer. In multilayered embodiments, the film has additional top layers applied to this base layer and optionally additionally interlayers.

For the purposes of the present invention, the term "film" denotes a single-layered film which consists only of this base layer and multilayered films which are composed of the base layer and additional layers.

For the purposes of the present invention, mention is made of polymers I made from at least one hydroxycarboxylic acid "PHC" (polyhydroxycarboxylic acid). These are taken to mean homopolymers or copolymers built up from polymerised units of hydroxycarboxylic acids. Of the PHCs which are suitable for the present invention, polylactic acids are particularly suitable. These are referred to below as PLA (polylactide acid). Here too, the term is taken to mean both homopolymers built up only from lactic acid units and copolymers comprising predominantly lactic acid units (>50%) in compounds with other comonomers, in particular other hydroxylactic acid units.

The biaxially stretched, plastically shaped film is produced by a process in which the biaxially stretched film according to the invention is plastically shaped under the action of pneumatic forces or through the mechanical action of moulds or through a combination of pneumatic and mechanical forces. This shaping is preferably carried out at elevated temperature. However, it is also possible, surprisingly, to carry out this shaping at room temperature through the addition of at least 0.2% by weight of polymer II.

The plastic shaping by means of pneumatic forces can be carried out through a reduced pressure (thermoforming) or an excess pressure, i.e. compressed air. Processes of this type are known from the prior art and are referred to as "thermoforming". The processes and their detailed design are described, for example, in Rosato's Plastics Encyclopedia and Dictionary, pages 755 to 766, which is expressly incorporated herein by way of reference. The processes according to the invention for the shaping of the biaxially stretched films having a modified base layer can be carried out in accordance with the principles and modifications described therein for unstretched materials; For the purposes of the present invention, processes of this type for the plastic shaping of the biaxially stretched film under the action of pneumatic and/or mechanical forces are referred to collectively as shaping or plastic shaping.

Plastic shaping of the film under the action of pneumatic forces is carried out, for example, by means of a reduced pressure and is then also known as thermoforming. In the thermoforming of the biaxially oriented film according to the invention, the prefabricated, biaxially stretched film is laid over a suitable moulding, which is thus sealed off in an air-tight manner. More suitably, a reduced pressure or vacuum is applied to the moulding. Owing to the pressure difference between the vacuum chamber and the environment, suction acts on the film functioning as seal.

Warming of the film with the aid of a heating element enables the deformability of the film to be increased. The heating element is then installed above the film surface and thus takes care of the warming of the film before or during the shaping step. The film deforms in the direction of the moulding under the action of the reduced pressure, if necessary with the simultaneous action of the elevated temperature. The temperature, reduced pressure and the sequence of action are selected in the process in such a way that the film comes into positive contact with the moulding. After elimination of the pressure difference and, where appropriate, cooling, the film retains its shape; it has been plastically shaped.

Various embodiments of the thermoforming processes are depicted by way of example in FIG. 1 and show diagrammatically devices for the thermoforming of the biaxially stretched film. Further shaping processes are depicted in FIGS. 2 and 3.

In the processes according to the invention for the plastic shaping of the biaxially oriented film according to the invention, any desired suitable moulds which can be evacuated and optionally moulding tools can in principle be employed. In a particularly advantageous embodiment of the invention, the mould used is a shaped support made from a porous material or a support provided with aeration devices which, as a composite with the plastically shaped film, can itself be employed as container, for example tray or pot, for the pack contents. Preferably, the material of the shaped support which is porous or provided with an aeration device and which is employed as mould is made from a renewable raw material and, like the film, is degradable. Porous shaped supports which are used as containers are, for example, made from starch, based on cellulose, for example made from paper or cardboard, or made from materials such as peat, cork, etc., of which starch is preferred.

For shaping processes at elevated temperature, the biaxially stretched film according to the invention is warmed to a temperature of from 40 to 150° C., preferably from 60 to 130° C., in particular from 80 to 120° C. This warming is in the simplest case carried out by means of a heating device installed in the spatial vicinity of the film, usually above it. Suitable heating devices are, for example, infrared emitters or hot-air fans.

Surprisingly, it has been found that the shapability of the film can be improved by the addition of thermoplastic polymers, such as polyolefins, preferably propylene polymers or polyethylenes, or polyesters. In particular, it is possible to plastically shape the biaxially stretched film according to the invention by means of pneumatic and/or mechanical forces within a large temperature range after the stretching. In addition, it is also possible to employ particularly thin biaxially stretched films in the shaping processes. This is not possible with conventional biaxially oriented films made from thermoplastics. The mechanical strengths of the conventional biaxially stretched films are, owing to the orientation, so high that cracks or hole formation occur during the action of reduced pressure or excess pressure or during mechanical shaping of such films or the deformation is inadequate.

The plastically shaped film can be employed in various ways for the production of packaging. For example, the plastically shaped film can be applied as lid film to correspondingly shaped supports in the form of trays or containers which themselves require additional protection, for example against moisture. In this case, a combination of a plastically shaped film and a porous moulding, for example made from starch, cellulose material, cork, etc., is particularly preferred. The coating or lamination of the shaped supports with the plastically shaped film can be carried out in a suitable manner. For example, partial adhesive bonding of the plastically shaped film to the shaped support may be sufficient. For other cases, adhesive bonding over the entire surface is desired.

In a further embodiment, the lamination of the film to the shaped support can be carried out in a single working step with the shaping of the biaxially oriented film, for example by thermoforming, blow moulding and/or mechanical shaping. Either a single-layered or multilayered biaxially oriented film can be employed here. The surface of the film is heat-sealed or adhesively bonded to the moulding during the shaping. Surprisingly, it has been found for single-layered films that the addition of thermoplastic polymer II does not impair the heat-sealing of the film to the moulding.

Also suitable are embodiments of the film which have a top layer. The multilayered film is, during the shaping, positioned above the mouldings in such a way that the optionally adhesive or heat-sealable surface layer is facing the moulding. During shaping, any temperature increase in combination with excess pressure or reduced pressure and/or the action of mechanical force through the mould result in adhesion between the surface of the shaped support and the surface of the film, while the film comes into positive contact with the shaped support serving as mould during the shaping process. In general, it win be preferred for this process variant to carry out the shaping at elevated temperature in order to improve the adhesion. If desired, the shaped support is likewise warmed during shaping of the film in order to support the heat-sealing or lamination process, i.e. the formation of adhesion between the film surface and the shaped support. Coated films with adhesives or cold-sealing compositions on the surface can also simultaneously be bonded to the support by cold shaping at room temperature (from 15 to <40° C.).

A suitably coated film for this embodiment of the invention is produced either by coextrusion, or, if desired, in-line or off-line coating of the biaxially stretched film is also possible. Suitable coating materials are conventional adhesives or cold-sealing coatings, which are generally applied by off-line coating. Also advantageous are coextruded layers of PLA copolymers or mixtures of heat-sealable olefinic polymers, for example HDPE or propylene copolymers, with PLA. In a further advantageous embodiment, the film consists only of the base layer, into which an adhesive component is incorporated during the extrusion process in addition to the thermoplastic polymer II.

The above-described materials, such as starch, paper, cardboard, etc., for the support are equally suitable and advantageous as shaped supports in these combined processes since they are likewise made from renewable raw materials and are degradable. Materials having lower porosity into which aeration devices are incorporated are likewise suitable. Suitable materials are, for example, wood, metals or ceramics. The support simultaneously employed as mould should basically have a spatial three-dimensional shape such that it is suitable for the accommodation of pack contents. Any desired spatial shapes are suitable here, such as, for example, dishes, pots, trays, casting parts or other container-like shapes.

In a further use, the plastically shaped film can be used for the production of a so-called blister pack. In this case, the plastically shaped film is filled with pack contents and sealed with a sheet-like support. The film here is partially heat-sealed or adhesively bonded to the support. The raw materials employed for the support are preferably compostable materials made from renewable raw materials, for example starch, cellulose-based materials and compostable films of suitable thickness.

For the various shaping processes for the production of the plastically shaped film, both single-layered and multilayered biaxially oriented films can in principle be employed. Multilayered films are generally built up from the base layer and at least one top layer. In principle, the mixtures of polymer I and II described for the base layer can likewise be used for the top layers. In principle, top layers built up only from PHC can also be applied. If desired, it is also possible to employ modified PLA raw materials in the top layer. The top layer(s) is (are) either applied to the surface of the base layer or to the surface of any interlayer additionally present.

The base layer of the film generally comprises from at least 80 to 99.8% by weight, preferably from 85 to 99.5% by weight, in particular from 90 to <99.5% by weight, in each case based on the layer, of a polymer based on a hydroxycarboxylic acid and from 0.2 to 15% by weight, preferably from 0.5 to 10% by weight, in particular from 0.5 to 5% by weight of a thermoplastic polymer II, and optionally additionally conventional additives in effective amounts in each case.

Suitable monomers of the polymers based on hydroxycarboxylic acids are, in particular, mono-, di- or trihydroxycarboxylic acids or dimeric cyclic esters thereof, of which lactic acid in its D or L form is preferred. A particularly suitable PLA is polylactic acid from Cargill Dow (Nature-Works®). The preparation of this polylactic acid is known from the prior art and is carried out by catalytic ring-opening polymerisation of lactide (1,4-dioxane-3,6-dimethyl-2,5-dione), the dimeric cyclic ester of lactic acid, for which reason PLA is also frequently known as polylactide. The preparation of PLA has been described in the following publications: U.S. Pat. No. 5,208,297, U.S. Pat. No. 5,247,058 and U.S. Pat. No. 5,357,035.

Preference is given to polylactic acids built up exclusively from lactic acid units. Of these, particular preference is given to PLA homopolymers comprising 80–100% by weight of L-lactic acid units, corresponding to from 0 to 20% by weight of D-lactic acid units. In order to reduce the crystallinity, even higher concentrations of D-lactic acid units may also be present. If desired, the polylactic acid may comprise additional mono- or polyhydroxy acid units other than lactic acid as comonomer, for example glycolic acid units, 3-hydroxypropanoic acid units, 2,2-dimethyl-3-hydroxypropanoic acid units or higher homologues of the hydroxycarboxylic acids having up to 5 carbon atoms.

Preference is given to lactic acid polymers having a melting point of from 110 to 170° C., preferably from 125 to 165° C., and a melt flow index (measurement DIN 53 735 at a load of 2.16 N and 190° C.) of from 1 to 50 g/10 min, preferably from 1 to 30 g/10 min. The molecular weight of the PLA is in the range from at least 10,000 to 500,000 (number average), preferably from 50,000 to 300,000 (number average). The glass transition temperature Tg is preferably in the range from 40 to 100° C., preferably from 40 to 80° C.

The thermoplastic polymers II which are added to the base layer improve the thermoformability of the film compared with films which have a PLA base layer without these thermoplastic polymers. This advantageous action has been found, in particular, in the case of mixtures of PHC, preferably PLA, and polypropylenes, mixtures of PHC, preferably PLA, and polyethylenes, and mixtures of PHC, preferably PLA, and polyesters.

Polypropylenes which are suitable for the mixtures are polymers which comprise at least 50% by weight of propylene units. Examples of suitable propylene polymers as thermoplastic polymer II are propylene homopolymers, copolymers of ethylene and propylene or propylene and 1-butylene or terpolymers of ethylene and propylene and 1-butylene or a mixture or blend of two or more of the said homopolymers, copolymers and terpolymers.

Particularly suitable are random ethylene-propylene copolymers having an ethylene content of from 1 to 20% by weight, preferably from 2.5 to 10% by weight, or random propylene-1-butylene copolymers having a butylene content of from 2 to 25% by weight, preferably from 4 to 20% by weight, in each case based on the total weight of the copolymer, or random ethylene-propylene-1-butylene terpolymers having an ethylene content of from 1 to 20% by weight, preferably from 2 to 6% by weight, and a 1-butylene content of from 2 to 20% by weight, preferably from 4 to 20% by weight, in each case based on the total weight of the terpolymer, or a blend or mixture of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the blend or mixture.

The suitable copolymers and/or terpolymers described above generally have a melt flow index of from 1.5 to 30 g/10 min, preferably from 3 to 15 g/10 min. The melting point is in the range from 100 to 140° C. The above-described blend of copolymers and terpolymers has a melt flow index of from 5 to 9 g/10 min and a melting point of from 100 to 150° C. All the melt flow indices indicated above are measured at 230° C. and a force of 21.6 N (DIN 53 735).

The suitable propylene homopolymers generally have a melt flow index of from 1.5 to 30 g/10 min, preferably from 3 to 15 g/10 min. The melting point of the homopolymers is in the range from 150 to 170° C., preferably from 155 to 165° C. Preference is given to isotactic homopolymers whose isotacticity is greater than 92%, preferably in the range from 94 to 98%. The n-heptane-soluble content of the isotactic propylene homopolymers is less than 10% by weight, preferably from 1 to 8% by weight, based on the weight of the homopolymer. All the melt flow indices indicated above are measured at 230° C. and a force of 21.6 N (DIN 53 735).

Polyethylenes which are suitable for the mixture basically include all homopolymers or copolymers which comprise predominantly, i.e. at least 50% by weight, preferably from 80 to 100% by weight, of ethylene units, for example LDPE, MDPE and HDPE.

For example, polyethylenes having a density in the range from 0.88 to 0.93 and a crystallite melting point in the range from 100 to 120° C. can be employed. The melt flow index is preferably from 0.1 to 10 g/10 min (190/2.16). Low-density polyethylenes of this type are known per se from the prior art as LDPE, LLDPE or VLPE. These low-density polyethylenes have molecule branches with side chains of different length and are therefore also referred to as branched polyethylenes.

High- and medium-density polyethylenes are likewise suitable as polymer II. Ethylene homopolymers and ethylene copolymers are likewise suitable here. These polymers generally have only a few and short side chains and correspondingly higher crystallinities. The degree of crystallisation is in the range from 50 to 90%. The density for MDPE is from >0.93 to 0.945 g/cm$^3$, the melt flow index (190/2.16) is from 0.1 to 1 g/10 min, the crystallite melting point is from 110 to 130° C. For HDPE, the density is from >0.945 to 0.96 g/cm$^3$, the melt flow index (190/2.16) is from 0.1 to 1 g/10 min and the crystallite melting point is from 130 to 150° C.

The comonomers employed in polyethylenes are generally olefinic monomers, of which short-chain olefins having from 3 to 6 carbon atoms, in particular propylene and/or butylene, are preferred.

The above-mentioned polyethylenes are known per se from the prior art and have already been described as components of biaxially oriented polypropylene films. For the purposes of the present invention, HDPE are particularly preferred.

Suitable thermoplastic polyesters are the aromatic polyesters made from aromatic dicarboxylic acids and polyhydric alcohols which are known per se. Aromatic dicarboxylic acids are, for example, terephthalic acid, benzenedicarboxylic acid, naphthalene-2,6-dicarboxylic acid or isophthalic acid, polyhydric alcohols are, for example, diethylene glycol, triethylene glycol, ethanediol or butanediols. Particular preference is given to polyesters made from ethylene glycol or butylene glycol and terephthalic acid, which are also known as PET or PBT.

In addition, copolyesters known per se, which are also known as PET G and are based on three different monomers, in general at least two different polyhydric alcohols and one dicarboxylic acid, can advantageously be employed. Copolyesters of this type which are particularly suitable for the purposes of the present invention are described in EP 0 418 836, page 2 line 42, to page 3, line 1. This description is expressly incorporated herein by way of reference.

The thermoplastic polymer II selected is particularly advantageously polypropylenes, polyethylenes or polyesters which, as is known, are employed for the production of or in a biaxially oriented film made from the said polymers.

In addition to the said polymers I and II, the base layer may comprise conventional additives, such as neutralisers, stabilisers, antistatics and/or lubricants, in effective amounts in each case.

The film is optionally composed of a top layer of polyhydroxycarboxylic acids on one or both sides, applied to the base layer or to additional interlayers. The top layer(s) generally comprise(s) from 85 to 100% by weight of polyhydroxy acids, preferably from 90 to <100% by weight of polyhydroxy acids, and from 0 to 15% by weight or from >0 to 10% by weight respectively of conventional additives, in each case based on the weight of the top layer(s).

Examples of suitable polyhydroxy acids of the top layer(s) are polylactic acids built up exclusively from lactic acid units. Particular preference is given here to PLA polymers comprising 80–100% by weight of L-lactic acid units, corresponding to from 0 to 20% by weight of D-lactic acid units. In order to reduce the crystallinity, even higher concentrations of D-lactic acid units may also be present as comonomer. If desired, the polylactic acid may comprise additional polyhydroxy acid units other than lactic acid as comonomer, as described for the base layer.

For the top layer(s), lactic acid polymers having a melting point of from 110 to 170° C., preferably from 125 to 165° C., and a melt flow index (measurement DIN 53 735 at a load of 2.16 N and 190° C.) of from 1 to 50 g/10 min, preferably from 1 to 30 g/10 min, are preferred. The molecular weight of the PLA is in the range from at least 10,000 to 500,000 (number average), preferably from 50,000 to 300,000 (number average). The glass transition temperature Tg is in the range from 40 to 100° C., preferably from 40 to 80° C.

In a further embodiment, the top layer(s) may also be built up from the mixtures described above for the base layer of polymers I based on hydroxycarboxylic acid and thermoplastic polymers II. In principle, all mixtures of polymer I and II described above for the base layer are also suitable for the top layer.

If desired, the additives described above for the base layer, such as antistatics, neutralisers, lubricants and/or stabilisers, and optionally additionally antiblocking agents may be added to the top layer(s).

The thickness of the top layer(s) is greater than 0.1 μm and is preferably in the range from 0.1 to 5 μm, in particular from 0.5 to 3 μm, where top layers on both sides may have identical or different thicknesses. The total thickness of the film according to the invention can vary and is preferably from 5 to 80 μm, in particular from 8 to 50 μm, where the base layer in the case of multilayered embodiments makes up from about 40 to 98% of the total film thickness. For particularly environmentally friendly packaging, it is preferred to employ particularly thin films having a thickness of from 5 to 20 μm, preferably 5-15 μm. Surprisingly, the film having this thickness can still be shaped by thermoforming and other shaping methods.

The single-layered or multilayered biaxially oriented film is produced by the stenter or blowing process known per se.

In the stenter process, the melts corresponding to the individual layers of the film are extruded or coextruded through a flat-film die, the resultant film is taken off over one or more roll(s) for solidification, the film is subsequently stretched (oriented), and the stretched film is heat-set.

Biaxial stretching (orientation) is carried out sequentially or simultaneously. Sequential stretching is generally carried out successively, with successive biaxial stretching, in which stretching is firstly carried out longitudinally (in the machine direction) and then transversely (perpendicular to the machine direction), being preferred. The further description of the film production uses the example of flat-film extrusion with subsequent sequential stretching.

Here, as is usual in the extrusion process, the polymer or polymer mixture of the individual layers is compressed and liquefied in an extruder, where any additives added may already be present in the polymer or in the polymer mixture. It has proven particularly favourable to incorporate the thermoplastic polymers into the base layer in the form of a masterbatch. This masterbatch is based on PLA and comprises thermoplastic polymer, such as PP, PE or PET, in a concentration of from 5 to 40% by weight, based on the batch. If desired, the components of the mixture can be mixed in the corresponding concentrations in a separate granulation step by melt extrusion. It has been found that the incorporation of the thermoplastic polymers I into a PLA matrix by these techniques takes place particularly uniformly. The mixing of the pure components in the film extruder can, by contrast, result in fisheyes and optical flaws in the film, presumably caused by inadequate mixing of the polymers I and if in the film extruder. This process variant is therefore possible, depending on the mixture component, but is not preferred.

The melt(s) is (are) then forced through a flat-film die (slot die), and the extruded film is taken off over one or more takeoff rolls at a temperature of from 10 to 100° C., preferably from 20 to 60° C., during which it cools and solidifies.

The resultant film is then stretched longitudinally and transversely to the extrusion direction, which results in orientation of the molecular chains. The longitudinal stretching is preferably carried out at a temperature of from 50 to 150° C., advantageously with the aid of two rolls running at different speeds corresponding to the target stretching ratio, and the transverse stretching is preferably carried out at a temperature of from 50 to 150° C. with the aid of a corresponding tenter frame. The longitudinal stretching ratios are in the range from 1.5 to 6, preferably from 2 to 5. The transverse stretching ratios are in the range from 3 to 10, preferably from 4 to 7. It has been found that the addition of thermoplastic polymer enables the use of higher longitudinal and transverse stretching ratios compared with a PLA film without such additives.

The stretching of the film is followed by heat-setting (heat treatment) thereof, during which the film is held at a temperature of from 60 to 150° C. for about 0.1 to 10 seconds. The film is subsequently wound up in a conventional manner using a wind-up device.

The invention is explained below with reference to working examples.

Part A. Production of the Biaxially Stretched PLA Film

EXAMPLE 1

A single-layered film having a thickness of 15 μm was produced by extrusion and subsequent stepwise orientation in the longitudinal and transverse directions. The layer was built up from about 99% of a polylactic acid having a melting point of 135° C. and a melt flow index of about 3 g/10 min and a glass transition temperature of about 60° C., and about 1% of a propylene homopolymer (trade name Escorene PP4352F1) and comprised stabilisers and neutralisers in conventional amounts. The production conditions in the individual process steps were as follows:

| Extrusion: | Temperatures: Base layer: | 195° C. |
| --- | --- | --- |
| | Temperature of take-off roll: | 50° C. |
| Longitudinal stretching: | Temperature: | 68° C. |
| | Longitudinal stretching ratio: | 2.5 |
| Transverse stretching: | Temperature: | 88° C. |
| | Transverse stretching ratio (effective): | 5.5 |
| Setting: | Temperature: | 88° C. |
| | Convergence: | 5% |

EXAMPLE 2

A single-layered film having a thickness of 15 µm was produced by extrusion and subsequent stepwise orientation in the longitudinal and transverse directions as described in Example 1. In contrast to Example 1, the layer was built up from about 99% of a polylactic acid having a melting point of 135° C. and a melt flow index of about 3 g/10 min and a glass transition temperature of about 60° C., and about 1% of a polyethylene (trade name LDPE PG 7004, produced by Dow) and comprised stabilisers and neutralisers in conventional amounts.

EXAMPLE 3

A single-layered film having a thickness of 15 µm was produced by extrusion and subsequent stepwise orientation in the longitudinal and transverse directions as described in Example 1. In contrast to Example 1, the layer was built up from about 99% of a polylactic acid having a melting point of 135° C. and a melt flow index of about 3 g/10 min and a glass transition temperature of about 60° C., and about 1% of a polyester (Eastar PETG6763, produced by Eastman) and comprised stabilisers and neutralisers in conventional amounts.

EXAMPLE 4

A three-layered film having a symmetrical structure and a total thickness of 20 µm was produced by coextrusion and subsequent stepwise orientation in the longitudinal and transverse directions. The top layers each had a thickness of 1.5 µm. The base layer was; as described in Example 1, built up from about 99% of a polylactic acid having a melting point of 135° C. and a melt flow index of about 3 g/10 min and a glass transition temperature of about 60° C., and about 1% of a polypropylene (trade name Escorene PP4352F1) and comprised stabilisers and neutralisers in conventional amounts. The top layers were built up from about 99% of a polylactic acid having a melting point of 135° C. and a melt flow index of about 3 g/10 min and a glass transition temperature of about 60° C., and about 1% of a polypropylene (trade name Escorene PP4352F1) and comprised stabilisers and neutralisers as well as lubricants and antistatics in conventional amounts.

The production conditions in the individual process steps were as follows:

| Extrusion: | Temperatures: Base layer: | 195° C. |
| --- | --- | --- |
| | Top layers: | 175° C. |
| | Temperature of take-off roll: | 50° C. |
| Longitudinal stretching: | Temperature: | 68° C. |
| | Longitudinal stretching ratio: | 3 |
| Transverse stretching: | Temperature: | 85° C. |
| | Transverse stretching ratio (effective): | 5.5 |
| Setting: | Temperature: | 75° C. |
| | Convergence: | 5% |

EXAMPLE 5

A three-layered film having a symmetrical structure and a total thickness of 20 µm was produced by coextrusion and subsequent stepwise orientation in the longitudinal and transverse directions. The top layers each had a thickness of 1.5 µm. The base layer was built up from about 99% of a polylactic acid having a melting point of 135° C. and a melt flow index of about 3 g/10 min and a glass transition temperature of about 60° C., and about 0.5% of a polypropylene (trade name Escorene PP4352F1) and about 0.5% of a polyester (trade name Eastar PETG6763, produced by Eastman) and comprised stabilisers and neutralisers as well as lubricants and antistatics in conventional amounts.

The production conditions in the individual process steps were as follows:

| Extrusion: | Temperatures: Base layer: | 195° C. |
| --- | --- | --- |
| | Top layers: | 175° C. |
| | Temperature of take-off roll: | 50° C. |
| Longitudinal stretching: | Temperature: | 68° C. |
| | Longitudinal stretching ratio: | 3 |
| Transverse stretching: | Temperature: | 85° C. |
| | Transverse stretching ratio (effective): | 5.5 |
| Setting: | Temperature: | 75° C. |
| | Convergence: | 5% |

Part B: Plastic Shaping of the Biaxially Stretched Films

EXAMPLE 6

The thermoforming mould used is a porous starch moulding which does not bond to the film. The films produced as described in Examples 1 to 5 were used. The thermoforming apparatus used was a commercially available thermoforming apparatus (for example KFG37, produced by Illig). The film is stretched over the porous starch moulding and sealed off in an air-tight manner. The film is warmed at a heating rate of about 60% for about 0.5 seconds. A vacuum is subsequently drawn through the porous moulding, and a reduced pressure of about 1 bar is produced while the warming is maintained. After about 4 seconds, the vacuum is released and the heating removed. Under the action of the reduced pressure and the heating, the film comes into positive contact with the porous moulding. After cooling, the film remains in this shape.

EXAMPLE 7

The thermoforming mould used is a porous starch moulding which does not bond to the film. The films produced as described in Examples 1 to 5 were used. The thermoforming apparatus used is a commercially available thermoforming apparatus (for example KFG37, produced by Illig). The film is stretched over the porous starch moulding and sealed off in an air-tight manner. The film is warmed at a heating rate of about 80% for about 0.5 seconds. A vacuum is subsequently drawn through the porous moulding, and a reduced pressure of about 1 bar is produced while the warming is maintained. After about 2 seconds, the vacuum is released and the heating removed. Under the action of the reduced pressure and the heating, the film comes into positive contact with the porous moulding. After cooling, the film remains in this shape.

EXAMPLE 8

The thermoforming mould used is a porous starch moulding which does not bond to the film. The films produced as described in Examples 1 to 5 were used. The thermoforming apparatus used is a commercially available thermoforming apparatus (for example KFG37, produced by Illig). The film is stretched over the porous starch moulding and sealed off in an air-tight manner. The film is warmed at a heating rate of about 100% for about 0.5 seconds. A vacuum is subsequently drawn through the porous moulding, and a reduced pressure of about 1 bar is produced while the warming is maintained. The vacuum is subsequently released and the heating removed. Under the action of the reduced pressure and the heating, the film comes into positive contact with the porous moulding. After cooling, the film remains in this shape.

The invention claimed is:

1. Process for the plastic shaping of a biaxially stretched film, characterised in that the biaxially stretched film is composed of at least one base layer which comprises at least one polymer I made from at least one hydroxycarboxylic acid and ≧0.2% by weight, based on the weight of the layer, of a thermoplastic polymer II selected from the group consisting of propylene polymer, polyethylene polymer and aromatic polyester, and wherein the film is plastically shaped through the action of pneumatic and/or mechanical forces, and wherein the film has a thickness of 5 to 80 μm.

2. Process according to claim 1, characterised in that the biaxially oriented film is warmed to a temperature of from 40 to 150° C. before or during the shaping.

3. Process according to claim 1, characterised in that the biaxially oriented film is shaped at a temperature of from 15 to <40° C.

4. Process according to claim 1, characterised in that the polymer I is a polylactic acid.

5. Process according to claim 4, characterised in that the polymer I is a polylactic acid which has 80–100% by weight of L-lactic acid units and from 0 to 20% by weight of D-lactic acid units or other polyhydroxycarboxylic acid units.

6. Process according to claim 1, characterised in that the propylene polymer is a propylene homopolymer or propylene copolymer, and the polyethylene polymer is an HDPE, an LDPE or an MDPE, and the polyester is a PET or a PBT.

7. Process according to claim 1, characterised in that the base layer comprises polymer I in an amount of from 85 to 99.8% by weight, and polymer II in an amount of from 0.5 to 15% by weight, in each case based on the layer.

8. Process according to claim 1, characterised in that the biaxially oriented film is warmed to an elevated temperature by means of IR emitters and/or hot air and/or hot steam.

9. Process according to claim 1, characterised in that the pneumatic forces act on the biaxially oriented film as reduced pressure or excess pressure.

10. Process according to claim 1, characterised in that the shaping of the biaxially oriented film is carried out by means of thermoforming.

11. Process according to claim 1, characterised in that the biaxially oriented film has a thickness of from 5 to 20 μm before the shaping.

12. Process according to claim 1, characterised in that the biaxially oriented film comes into positive contact with a mould under the action of the pneumatic and/or mechanical forces.

13. A method of using a biaxially stretched film which has been plastically shaped in accordance with claim 1 for the production of packaging comprising the step of producing packaging with the film.

14. Packaging comprising a biaxially stretched film which has been plastically shaped in accordance with claim 1, and optionally further components.

15. Process for the production of a blister pack comprising a sheet-like support and a biaxially stretched film, characterised in that the biaxially stretched film is plastically shaped by a process according to claim 1 and is subsequently connected to the sheet-like support by means of lamination, adhesive bonding or heat-sealing.

16. Blister pack produced in accordance with claim 15.

17. Process for the production of packaging from a shaped support and a biaxially stretched and plastically shaped film, characterised in that the biaxially stretched film has been plastically shaped by a process for the plastic shaping of the biaxially stretched film, characterised in that the biaxially stretched film is composed of at least one base layer which comprises at least one polymer I made from at least one hydroxycarboxylic acid and ≧0.2% by weight, based on the weight of the layer, of a thermoplastic polymer II selected from the group consisting of propylene polymer, polyethylene polymer and aromatic polyester, and wherein the film is plastically shaped through the action of pneumatic and/or mechanical forces, and wherein the film has a thickness of 5 to 80 μm, and, after the shaping, is applied to a support of the same shape by means of lamination, adhesive bonding or heat-sealing.

18. Process according to claim 16, characterised in that the mould used during production of the plastically shaped film has the same spatial shape as the shaped support.

19. Process according to claim 17 characterised in that the adhesive bonding of the film to the shaped support is carried out over the entire surface or part of the surface or in a punctiform manner.

20. Process according to claim 17, characterised in that the shaped support has the shape of a container, and is built up from starch, paper or cardboard.

21. Packaging produced by a process according to claim 17.

22. Process for the production of packaging from a shaped support and a biaxially stretched film, characterised in that the biaxially stretched film is plastically shaped at elevated temperature by a process for the plastic shaping of the biaxially stretched film, characterised in that the biaxially stretched film is composed of at least one base layer which comprises at least one polymer I made from at least one hydroxycarboxylic acid and ≧0.2% by weight, based on the weight of the layer, of a thermoplastic polymer II selected from the group consisting of propylene polymer, polyethylene polymer and aromatic polyester, and wherein the film is plastically shaped through the action of pneumatic and/or mechanical forces, and wherein the film has a thickness of 5 to 80 μm, and wherein the biaxially oriented film is warmed to a temperature of from 40 to 150° C. before or during the shaping, and using a mould which itself forms the shaped support of the packaging, and adhesion is produced between the surface of the shaped support and the surface of the film during the plastic shaping of the biaxially stretched film.

23. Process according to claim 22, characterised in that the biaxially stretched film is a multilayered film and has at least one top layer which is heat-sealable to the surface of the shaped support at the temperature at which the shaping process is carried out, and the heat-sealable top layer faces the shaped support which forms the mould during the shaping.

24. Process according to claim 22, characterised in that the biaxially stretched film is a coated film and has at least one coating which is adhesive or tacky to the surface of the shaped support at the temperature at which the shaping process is carried out, and the coating faces the shaped support which forms the mould during the shaping.

25. Process according to claim 22, characterised in that the shaped support is likewise warmed during the shaping of the biaxially stretched film.

26. Process according to claim 22, characterised in that the shaped support is made from a porous material and has the shape of a container, and the shaping of the film is carried out by means of thermoforming.

27. Packaging produced in accordance with claim 22.

* * * * *

UNITED STATES PATENT AND TRADEMARK OFFICE
CERTIFICATE OF CORRECTION

PATENT NO. : 7,128,969 B2
APPLICATION NO. : 10/472913
DATED : October 31, 2006
INVENTOR(S) : Sonja Rosenbaum et al.

It is certified that error appears in the above-identified patent and that said Letters Patent is hereby corrected as shown below:

<u>Title Page</u> Item (75)

In the Inventors, delete "Marlies Rosenbaum and Manfred Rosenbaum" and insert -- Sonja Rosenbaum, Bous (DE) --

In Claim 18, at column 14, line 44 "18. Process according to claim 16, characterized in that" should read -- 18. Process according to claim 17, characterized in that --.

Signed and Sealed this

Twenty-first Day of August, 2007

JON W. DUDAS
*Director of the United States Patent and Trademark Office*